(12) United States Patent
Yabe et al.

(10) Patent No.: US 7,450,932 B2
(45) Date of Patent: Nov. 11, 2008

(54) APPARATUS AND METHOD FOR FORWARDING E-MAIL

(75) Inventors: Toshiyasu Yabe, Yokohama (JP); Masaki Hirose, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 1023 days.

(21) Appl. No.: 10/825,631

(22) Filed: Apr. 15, 2004

(65) Prior Publication Data
US 2004/0254996 A1    Dec. 16, 2004

(30) Foreign Application Priority Data
Apr. 16, 2003  (JP) ............................. 2003-112049

(51) Int. Cl.
H04M 11/10 (2006.01)
(52) U.S. Cl. .................... 455/413; 379/88.25; 709/206; 709/217; 715/752
(58) Field of Classification Search .............. 379/88.22, 379/88.25; 709/206, 223, 217; 455/413; 715/752
See application file for complete search history.

(56) References Cited

U.S. PATENT DOCUMENTS

| | | | |
|---|---|---|---|
| 6,035,104 A | | 3/2000 | Zahariev |
| 7,275,095 B1* | | 9/2007 | Lebouill ............... 709/223 |
| 2002/0042815 A1* | | 4/2002 | Salzfass et al. ............ 709/206 |
| 2002/0152272 A1 | | 10/2002 | Yairi |
| 2003/0055902 A1* | | 3/2003 | Amir et al. .............. 709/206 |

FOREIGN PATENT DOCUMENTS

| | | |
|---|---|---|
| JP | 2000-101746 A | 4/2000 |
| JP | 2001-217861 A | 8/2001 |
| JP | 2001-257712 A | 9/2001 |
| JP | 2002-157195 A | 5/2002 |

(Continued)

OTHER PUBLICATIONS

Research In Motion Ltd., "Technical White Paper BlackBerry Enterprise Edition for Microsoft Exchange version 2.1", 2001, pp. 1-15.

(Continued)

*Primary Examiner*—Gerald Gauthier
(74) *Attorney, Agent, or Firm*—Brinks Hofer Gilson & Lione

(57) ABSTRACT

An e-mail management apparatus is provided, which enables a customer to select an active e-mail account freely and to read e-mails stored in the mailbox corresponding to the inactive e-mail account. E-mail management apparatus receives an e-mail transmitted from a node in the Internet, stores the received e-mail in a storage location corresponding to a terminal identifier, the terminal identifier corresponding to an e-mail account, and the e-mail account corresponding to the destination e-mail address of the e-mail forwards the received e-mail to the communication terminal designated by the terminal identifier corresponding to the e-mail account, when the e-mail account corresponding to the destination e-mail address of the e-mail is active. E-mail management apparatus transfers e-mails stored in the storage location to the communication terminal designated by a terminal identifier, in response to a request of a transmission of the e-mails stored in the storage location corresponding to the terminal identifier.

6 Claims, 7 Drawing Sheets

FOREIGN PATENT DOCUMENTS

| | | |
|---|---|---|
| JP | 2002-183029 A | 6/2002 |
| JP | 2002-374306 A | 12/2002 |

OTHER PUBLICATIONS

Saito, T. et al., "BIGLOBE Communication Service", NEC Technical Report, vol. 54, No. 12, Dec. 25, 2001, pp. 43-46.

EPO Office Action dated Apr. 13, 2006.

Japanese Office Action mailed May 16, 2006.

Hajime Kawamura, "How to use a plurality of mail accounts using free mail service", Monthly ASCII, vol. 4, No. 3, pp. 112-115, Mar. 1, 2001.

* cited by examiner

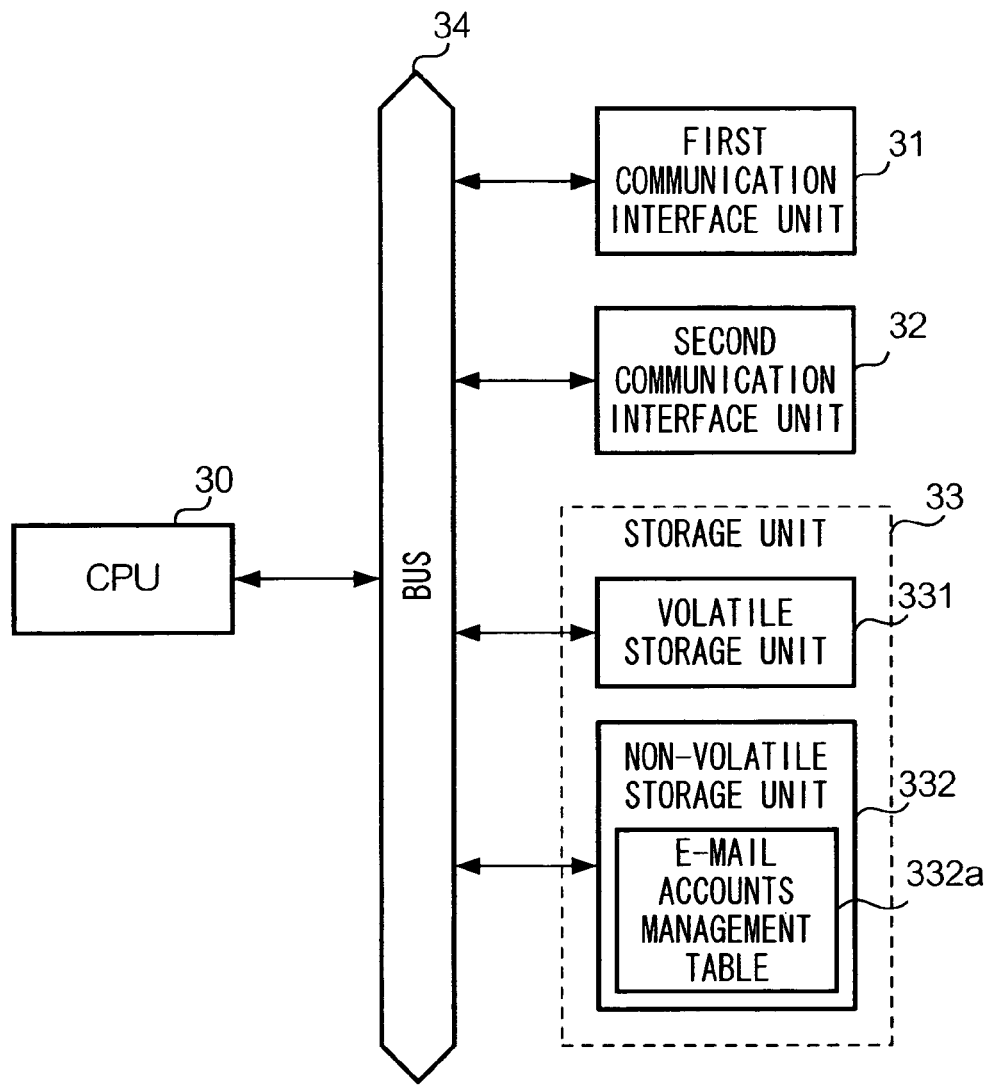

| E-MAIL ACCOUNT | E-MAIL ACCOUNT FLAG | TERMINAL ID |
|---|---|---|
| AAA1 | 0 | 09011112222 |
| AAA2 | 1 | 09011112222 |
| AAA3 | 0 | 09011112222 |

| TITLE | TRANSMISSION NODE ADDRESS |
|---|---|
| title01 | abc@abc.co.jp |
| title02 | abc@abc.co.jp |
| title03 | xyz@xyz.co.jp |

APPARATUS AND METHOD FOR FORWARDING E-MAIL

This application claims priority under 35 U.S.C. § 119 to Japanese Patent Application No. 2003-112049 filed Apr. 16, 2003, the entire content of which is hereby incorporated by reference.

BACKGROUND

1. Technical Field

The present invention relates to the forwarding of e-mail messages, and especially to preventing forwarding of offensive, unnecessary, and junk e-mail messages while allowing forwarding of useful and important e-mails.

2. Related Art

In recent years, communication service providers have provided a variety of Internet related communication services. An e-mail communication service is a typical example of such a service. When a customer makes a contract with a communication service provider, the communication service provider assigns to the customer an e-mail management apparatus for providing the e-mail communication service; and provides the customer with an e-mail account, by use of which the customer may access the e-mail management apparatus. A "mailbox" is created in the e-mail management apparatus, corresponding to the e-mail account of the customer. The mailbox is a storage location for storing received e-mails addressed to the customer. Then, an e-mail address for representing a destination of an e-mail is assigned to the customer in the composite form of the e-mail account of the customer and an identifier for identifying the e-mail management apparatus (a domain name assigned to e-mail management apparatus, for example).

A common problem for e-mail users is so-called 'junk mail'. Junk mail is sent for the purpose of advertising and is sent to many e-mail addresses. Most junk mail messages are offensive and/or useless for the customer receiving them. Therefore, it is desirable to provide a method and an apparatus to prevent such junk mail being forwarded to customers.

A number of ideas have been proposed to provide a method and/or an apparatus for preventing the forwarding of junk e-mail messages to customers. For example, Japanese patent publication JP 2001-A-257712 discloses a system which determines that a received e-mail message is junk mail and deletes it without forwarding it, when the received e-mail has features which are common to a predetermined number of received e-mails addressed to a plurality of e-mail addresses. However, in such a system it is difficult to use consistent criteria for determining whether a received message is junk mail, as a sender may send junk mail messages in a variety of formats.

Changing e-mail accounts is a well-known method of effectively avoiding receipt of junk mail. Since an e-mail address is bound to an e-mail account as described above, use of a different e-mail account has the same effect as use of a different e-mail address. Accordingly, when a new e-mail account is used, junk mail will not be received until the e-mail address bound to the new e-mail account becomes known to a sender. However, if a customer discards an e-mail account, valuable messages stored in the mailbox will be deleted and become inaccessible.

SUMMARY OF THE INVENTION

The present invention was conceived in view of the above-described situation; and provides a method and an apparatus for forwarding e-mails, which enable a customer to read e-mails stored in a mailbox corresponding to a former e-mail account even after changing to a different e-mail account.

The present invention provides an e-mail management apparatus including a first storage unit for storing a record of one or more e-mail accounts provided to a customer and a corresponding terminal identifier for identifying a communication terminal carried by the customer; means for activating an e-mail account in response to a request from the customer, the e-mail account being included in a record stored in the first storage unit; means for receiving an e-mail; a second storage unit comprising a storage location corresponding to a terminal identifier, wherein an e-mail received by the receiving means is stored in the storage location corresponding to the terminal identifier included in a record stored in the first storage unit, and the record is designated by the e-mail account corresponding to a destination e-mail address of the e-mail; first transmission means for transmitting a received e-mail to the communication terminal designated by the terminal identifier included in the record stored in the second storage unit corresponding to the e-mail account, when the e-mail account corresponding to the destination e-mail address of the received e-mail is active; and second transmission means for transmitting to the communication terminal carried by a customer the e-mail stored in the second storage unit corresponding to the terminal identifier of the communication terminal.

Also, the present invention provides an e-mail forwarding method including the steps of: setting the statuses of one or more of a plurality of e-mail accounts corresponding to a terminal identifier as active, in response to a request from a communication terminal designated by the terminal identifier; receiving e-mails addressed to any of the destination e-mail addresses corresponding to the plurality of e-mail accounts; forwarding the e-mails received in the receiving step to the communication terminal designated by the terminal identifier corresponding to the mail account, the e-mails being addressed to destination e-mail addresses corresponding to the active e-mail accounts; and forwarding the e-mails received in the receiving step and addressed to destination e-mail addresses corresponding to the inactive e-mail accounts, in response to a request to forward the mails.

Further, the present invention provides a computer program and/or a computer-apparatus-readable storage medium for recording the computer program, the computer program being for accomplishing the computer having: a first storage unit for storing a record including one or more e-mail accounts provided to a customer and a corresponding terminal identifier for identifying a communication terminal carried by the customer; means for changing the status of an e-mail account to active in response to a request by the customer, the e-mail account being included in a record stored in the first storage unit; means for receiving an e-mail; a second storage unit comprising a storage location corresponding to a terminal identifier, wherein an e-mail received by the receiving means is stored in the storage location corresponding to the terminal identifier included in a record stored in the first storage unit, and the record is designated by the e-mail account corresponding to a destination e-mail address of the e-mail; first transmission means for transmitting a received e-mail to the communication terminal designated by the terminal identifier included in the record stored in the second storage unit corresponding to the e-mail account, when the e-mail account corresponding to the destination e-mail address of the received e-mail is active; and second transmission means for transmitting to the communication terminal the e-mail stored in the second storage unit corresponding to the terminal identifier of a communication terminal carried by the customer.

Accordingly, a customer carrying a communication terminal can change an active e-mail account freely, and read e-mails stored in the mailbox corresponding to the former e-mail account even after changing to another new e-mail account.

BRIEF DESCRIPTION OF THE DRAWINGS

FIG. 2 is a block diagram illustrating a configuration of e-mail management apparatus 3 according to the present invention.

FIG. 3 is a drawing illustrating e-mail accounts management table 332*a* store in non-volatile storage unit 332 of e-mail management apparatus 3 according to the present invention.

DETAILED DESCRIPTION OF THE DRAWINGS AND THE PRESENTLY PREFERRED EMBODIMENTS

An embodiment according to the present invention will be described with reference to drawings.

A. Configuration

A-1: Communication System

Figure 1:
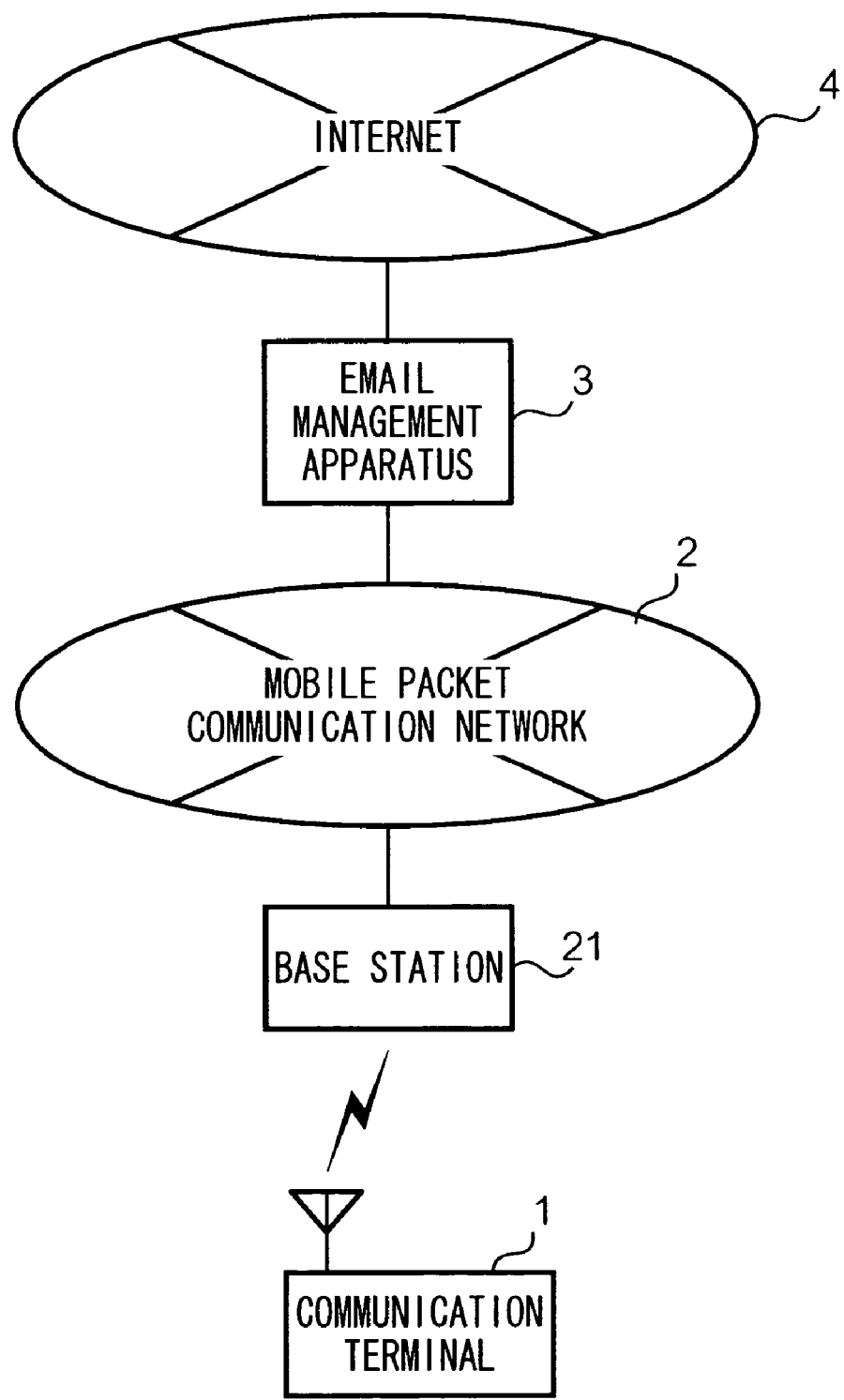
FIG. 1 is a drawing illustrating a configuration of a communication system and e-mail management apparatus 3 according to the present invention.

FIG. 1 is a drawing illustrating a communication system and an e-mail management apparatus according to the present invention. As shown in FIG. 1, the communication system includes a communication terminal 1, mobile packet communication network 2, e-mail management apparatus 3 and the Internet 4.

E-mail management apparatus 3 is configured as a computer apparatus which connects mobile packet communication network 2 and the Internet 4, and which is operated by a communication service provider operating mobile packet communication network 2. E-mail management apparatus 3 has a function of providing an e-mail service to a customer. More specifically, e-mail management apparatus 3 has storage for storing a number of e-mail accounts assigned by the communication service provider to the customers of the e-mail service, and the same number of mailboxes each for storing e-mails addressed to an e-mail address corresponding to each customer's e-mail account from a node in the Internet 4. In the present embodiment, e-mail accounts are classified into two types: active e-mail account or inactive e-mail account. E-mails addressed to an e-mail address corresponding to an active e-mail account are transmitted to the communication terminal 1 carried by a customer having the e-mail account; while e-mails addressed to an e-mail address corresponding to an inactive e-mail account are not transmitted to the communication terminal 1.

E-mail management apparatus 3 also has a gateway function for converting communication protocols between mobile packet communication network 2 and the Internet 4. Further, e-mail management apparatus 3 has a HTTP (Hyper Text Transport Protocol) server function for receiving a request message including an HTTP request from a source node, evaluating the received HTTP request, and transmitting to the source node a response to the HTTP request in the form of HTML (Hyper Text Markup Language) data. Subsequently, HTML data is evaluated by browsing software in the source node. This will be described in detail later.

Mobile packet communication network 2 is connected to e-mail management apparatus 3 and base stations 21; and provides a packet communication service to communication terminals 1 accommodated by base station 21. Base station 21 defines a wireless communication cell having a certain area around the base station 21; for example, an area having a radius of 500 meters with the base station 21 at the center; and performs a wireless communication with communication terminal 1 located in the wireless communication cell.

The communication system also includes a mobile telecommunication network (not shown in FIG. 1). The mobile telecommunication network provides communication terminal 1 with a general mobile telecommunication service.

Communication terminal 1 is configured as a mobile phone having general configuration and functions. Communication terminal 1 stores a terminal identifier (a telephone number, for example) assigned by the communication service provider for uniquely identifying communication terminal 1. Communication terminal 1 performs a wireless communication with base station 21 so as to be accommodated in the base station 21.

Communication terminal 1 also has an e-mail client function for transmitting an e-mail in response to a instruction from the customer carrying the communication terminal 1, for receiving the e-mail transmitted from e-mail management apparatus 3, and allowing the customer to read the received e-mail. Further, communication terminal 1 has a browsing function for transmitting a request message requesting a specific operation to a computer apparatus having an HTTP server function; receiving HTML data from the computer apparatus in response to the requested operation; and displaying images by evaluating the received HTML data.

Communication terminal 1 may perform a communication conforming HTTP (hereafter referred as a HTTP communication) with e-mail management apparatus 3 by using its browsing function. In the present embodiment, communication terminal 1 transmits a message including its terminal identifier as data representing a transmission node in an HTTP communication by using its browsing function.

A-2: E-Mail Management Apparatus 3

Next, configuration of e-mail management apparatus 3 will be described with reference to FIG. 2. FIG. 2 is a block diagram illustrating a hardware configuration of e-mail management apparatus 3. As shown in FIG. 2, e-mail management apparatus 3 includes CPU (Central Processing Unit) 30, first communication interface unit 31, second communication interface unit 32, storage unit 33, and bus 34 supporting data transmission and reception between these components.

CPU 30 controls centrally these components included in the e-mail management apparatus 3; and performs various arithmetic and logic operations.

First communication interface unit 31, which is connected to mobile packet communication network 2, performs communication with communication terminal 1 via mobile packet communication network 2. First communication interface unit 31 receives data transmitted from communication terminal 1, and outputs the received data to CPU 30; and receives data from CPU 30, and outputs the data to mobile packet communication network 2. Second communication interface unit 32, which is connected to the Internet 4, receives data transmitted from the Internet 4, and outputs the received data to CPU 30; and receives data from CPU 30, and outputs the data to the Internet 4.

Storage unit 33 includes volatile storage unit 331 and non-volatile storage unit 332. Volatile storage unit 331 provides CPU 30 with a working area; and is configured as RAM (Random Access Memory) in the present embodiment. Non-volatile storage unit 332 stores e-mail accounts management table 332a, operating system software program (hereafter referred to as OS software) for providing an operating system, and an e-mail management software program; and is configured as a hard disk drive in the present embodiment. A plurality of mailboxes is provided in non-volatile storage unit 332 for storing e-mails received from second communication interface unit 32; each mailbox corresponding to a terminal identifier of a communication terminal 1, and stores e-mails to be transmitted to the communication terminal 1.

Next, e-mail accounts management table 332a will be described with reference to FIG. 3. FIG. 3 is a drawing for illustrating records of e-mail accounts management table 332a. As shown in FIG. 3, e-mail accounts management table 332a stores a record for each e-mail account, including an e-mail account flag representing the status of the e-mail account, i.e. active or inactive, and a terminal identifier of communication terminal 1 carried by a customer having the assigned e-mail account. As shown in FIG. 3, the e-mail account flag has a value of either "1" or "0". The value "1" of the e-mail account flag means that the e-mail account is active. The value "0" of the e-mail account flag means that the e-mail account is inactive. Thus, CPU 30 may determine the status of the e-mail account, which is contained in the destination e-mail address of the e-mail received from second communication interface unit 32, by referring to records stored in e-mail accounts management table 332a.

Next, operations of CPU 30 will be briefly described, when CPU30 executes and performs software stored in non-volatile storage unit 332. When e-mail management apparatus 3 is turned on, CPU 30 loads OS software and performs it. While running OS software, CPU 30 controls components of e-mail management apparatus 3; loads e-mail management software and performs it; and is capable of executing and performing other software. While running e-mail management software, CPU 30 of e-mail management apparatus 3 performs an HTTP server function as well as three specific functions according to present invention.

First, CPU 30 performs a first function of receiving an e-mail from second communication interface unit 32a, storing the received e-mail in the corresponding mailbox; determining the status of the e-mail account contained in the destination e-mail address of the received e-mail, and transmitting the received e-mail to the destination in the case that the e-mail account is active.

Second, CPU 30 performs a second function of notifying communication terminal 1 of a record stored in e-mail accounts management table 332a in response to the message received from communication terminal 1, and updating records of e-mail accounts management table 332a. The second function of e-mail management apparatus 3 enables a customer to confirm which e-mail account is active among the e-mail accounts provided to the customer, and to change between active e-mail accounts freely.

Third, CPU 30 performs a third function of notifying a list of e-mails to communication terminal 1 in response to a request from communication terminal 1 for the transmission of the e-mails stored in a mailbox. By using the third function, e-mail management apparatus 3 may transmit an e-mail stored in the mailbox in response to a request of a customer, so that the customer is able to read the e-mail.

B. Operation

Operation of the communication system according to the present embodiment will be described in detail. As described above, CPU 30 in e-mail management apparatus 3 runs e-mail management software.

In the present example, the terminal identifier '09011112222' is assigned to communication terminal 1. Customers carrying communication terminal 1 have three e-mail accounts: 'AAA1', 'AAA2', and 'AAA3'. As shown in FIG. 3, at first the account 'AAA1' is set to active, the accounts 'AAA2' and 'AAA3' are set to inactive.

B-1: E-Mail Forwarding Operation

Figure 4:
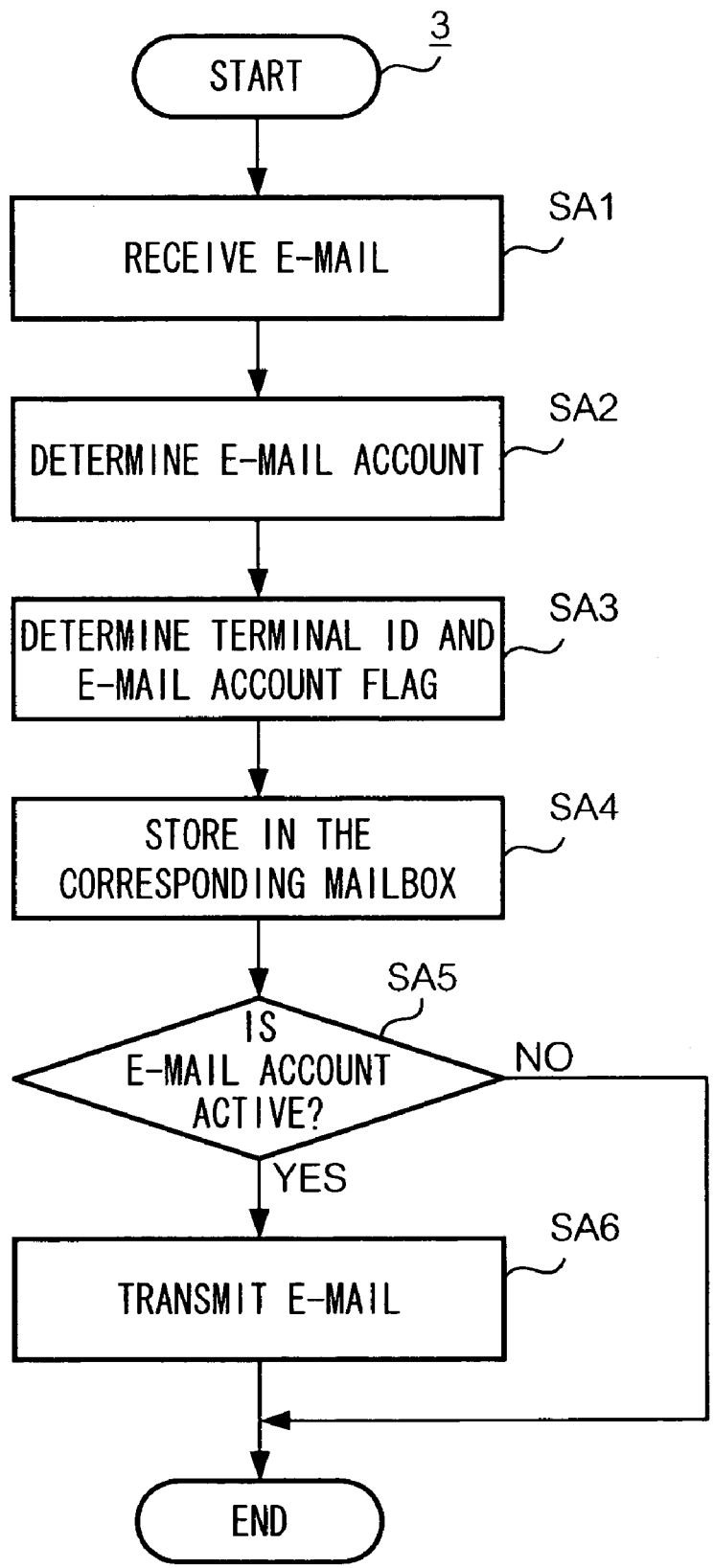
FIG. 4 is a flow chart illustrating a flow of an e-mail forwarding operation of CPU 30 in e-mail management apparatus 3.

First, an e-mail forwarding operation in e-mail management apparatus 3 will be described with reference to FIG. 4. FIG. 4 is a flow chart illustrating a flow of CPU 30 performing an e-mail forwarding operation.

As shown in FIG. 4, CPU 30 receives an e-mail transmitted from the Internet 4 via second communication interface unit 32 (step SA1); and determines which e-mail account corresponds to the destination e-mail address of the received e-mail (step SA2).

CPU 30 extracts a terminal identifier and an e-mail account flag, both corresponding to the e-mail account identifier extracted in the step SA2, from the e-mail accounts management table 332a (step SA3). In the present example, CPU 30 extracts the terminal identifier '09011112222' and the e-mail account flag '1' in the case that the e-mail account determined in the step SA2 is 'AAA1'; and extracts the terminal identifier '09011112222' and the e-mail account flag '0' in the case that the e-mail account determined in the step SA2 is 'AAA2'.

CPU 30 stores the e-mail received in the step SA1 in the mailbox corresponding to the terminal identifier extracted in the step SA3 (step SA4).

CPU 30 determines, on the basis of a value of the e-mail account flag extracted in the step SA3, whether the e-mail account determined in the step SA3 is active or not (step SA5). Specifically, CPU 30 determines that the e-mail account determined in the step SA2 is active, in the case that the value of the e-mail account flag extracted in the step SA3 is '1'; and determines that the e-mail account is inactive, in the case that the value is '0' (step SA5).

Subsequently, if CPU30 determines the e-mail account determined in the step SA2 to be active in the step SA5, CPU 30 transmits the e-mail received in the step SA1 to the communication terminal 1 corresponding to the terminal identifier determined in the step SA3 (step SA6). Thus, CPU30 terminates the e-mail forwarding operation. On the contrary, if CPU30 determines that the e-mail account is inactive, CPU 30 terminates the e-mail forwarding operation without forwarding the received e-mail.

As described above, according to the present embodiment of the e-mail management apparatus 3, an e-mail transmitted from a node in the Internet 4 is stored in a mailbox corresponding to an e-mail account determined from the destination e-mail address of the e-mail. The stored e-mail is transmitted to the communication terminal 1 designated by the terminal identifier corresponding to the e-mail account only if the e-mail account is active.

B-2: E-mail Accounts List Providing Operation

Figure 5:
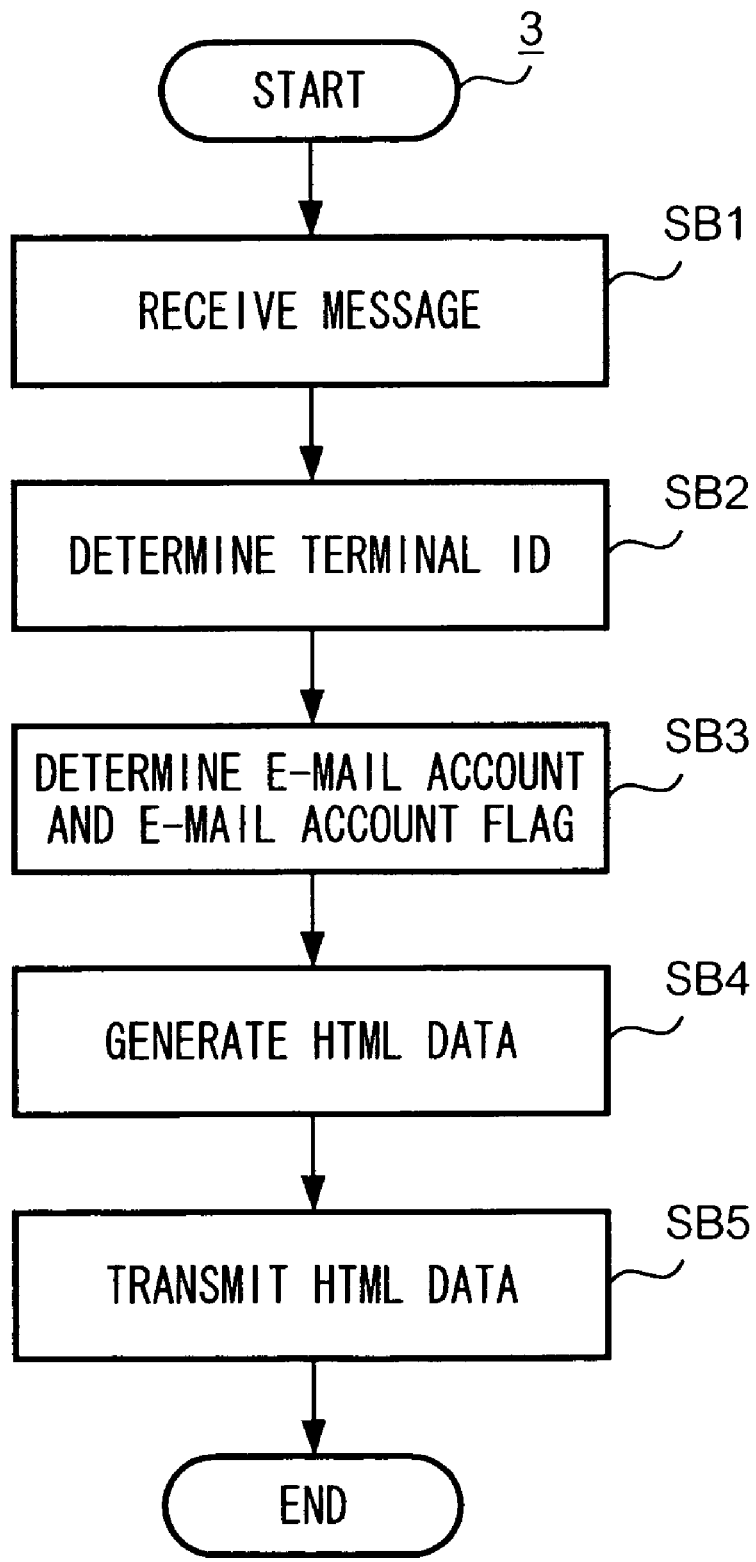
FIG. 5 is a flow chart illustrating a flow of an accounts list providing operation of CPU 30 in e-mail management apparatus 3.

Next, an accounts list providing operation in e-mail management apparatus 3 will be described with reference to FIG. 5. FIG. 5 is a flow chart illustrating a flow of an accounts list providing operation of CPU 30 in e-mail management apparatus 3.

As shown in FIG. 5, when a customer uses the browsing function of communication terminal 1 to request the transmission of one or more records of e-mail accounts and e-mail account flags corresponding to the terminal identifier of the communication terminal 1, the communication terminal 1 transmits the request to e-mail management apparatus 3. In the present example, the request includes the terminal identifier of the communication terminal 1. The request is transmitted to e-mail management apparatus 3 via base station 21 and mobile packet communication network 2.

As shown in FIG. 5, CPU 30 of e-mail management apparatus 3 receives the request via the first communication interface unit 31 (step SB1); and extracts a terminal identifier included in the request (step SB2).

Figure 6:
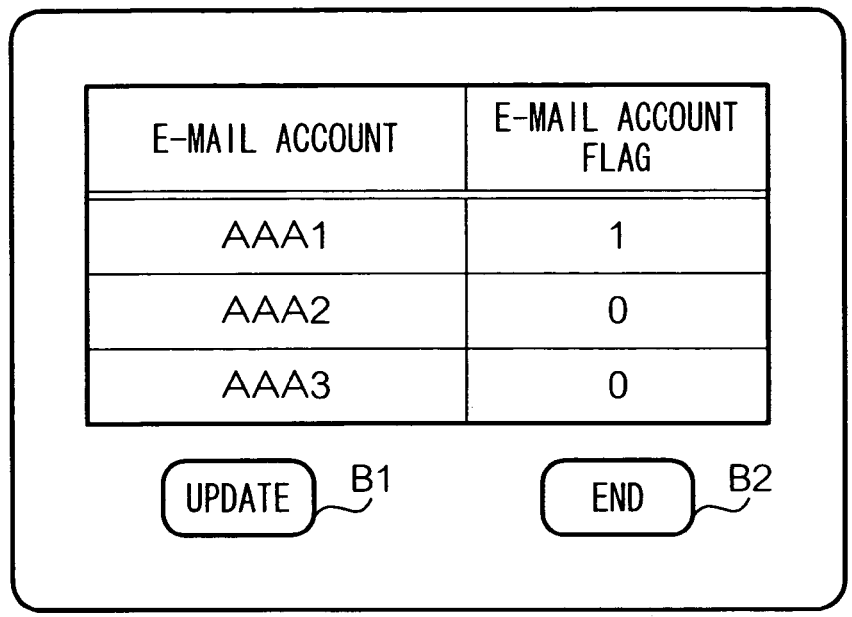
FIG. 6 illustrates an example of an e-mail accounts list displayed on the display unit of communication terminal 1.

On the basis of the terminal identifier extracted in the step SB2, CPU30 extracts a record of an e-mail account and an e-mail account flag stored in e-mail accounts management table 332*a* (step SB3); and generates HTML data for displaying e-mail accounts and corresponding e-mail account flags on the display unit of communication terminal 1 (step SB4). FIG. 6 illustrates an example of displaying these in the form of a list.

Then, CPU30 transmits a response including the HTML data generated in the step SB4 to the communication terminal 1 via first communication interface unit 31 (step SB5). Thus, CPU30 terminates the accounts list providing operation. Subsequently, the response is transmitted to the communication terminal 1 via mobile packet communication network 2 and base station 21.

On receiving the response, communication terminal 1 displays an accounts list on the display unit, as shown in FIG. 6. Thus, in the present example, the customer can visually confirm that his e-mail account 'AAA1 ' is active.

Accordingly, a customer carrying communication terminal 1 can confirm which of his/her e-mail accounts is active.

B-3: Active E-mail Account Changing Operation

Figure 7:
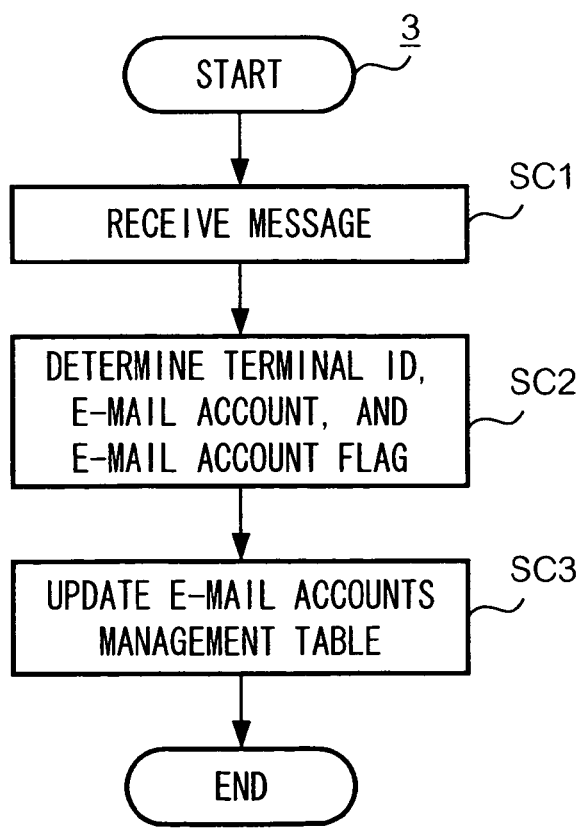
FIG. 7 is a flow chart illustrating a flow of an active e-mail account change operation of CPU 30 in e-mail management apparatus 3.

Third, an active e-mail account changing operation in e-mail management apparatus 3 will be described with reference to FIG. 7. FIG. 7 is a flow chart illustrating a flow of an active e-mail account change operation of CPU 30 in e-mail management apparatus 3. In the present example, the e-mail account 'AAA1' is active, at first, in the e-mail accounts as shown in FIG. 6.

As shown in FIG. 7, a customer changes the active e-mail account from the e-mail account 'AAA1'to ' AAA2'. Specifically, when the e-mail accounts list is shown on the screen as shown in FIG. 6, the customer inputs an instruction to change the value of the e-mail account flag corresponding to the e-mail account 'AAA1 'to "0"; and to change the value of the e-mail account flag corresponding to the e-mail account 'AAA2' to "1"; and presses update button B1.

In response to the above operation by the customer, communication terminal 1 generates a request for updating e-mail account flags corresponding to e-mail accounts 'AAA1 'and 'AAA2', in accordance with the input operation by the customer; and transmits the request to e-mail management apparatus 3. The request includes a terminal identifier of the communication terminal 1, e-mail accounts to be updated and updated values of the e-mail account flags corresponding to the e-mail accounts to be updated. The request is transmitted to e-mail management apparatus 3 via base station 21 and mobile packet communication network 2.

As shown in FIG. 7, CPU 30 of e-mail management apparatus 3 receives the request via first communication interface unit 31 (step SC1); and extracts a terminal identifier, e-mail accounts to be updated, and the update value of the e-mail accounts flags included in the request (step SC2).

On the basis of the terminal identifier, the e-mail accounts to be updated, and the update value of the e-mail accounts flags extracted in the step SC2, CPU30 then updates the corresponding records in e-mail accounts management table 332*a* (step SC3). Thus, CPU30 terminates the e-mail account changing operation.

Figures 8, 9:
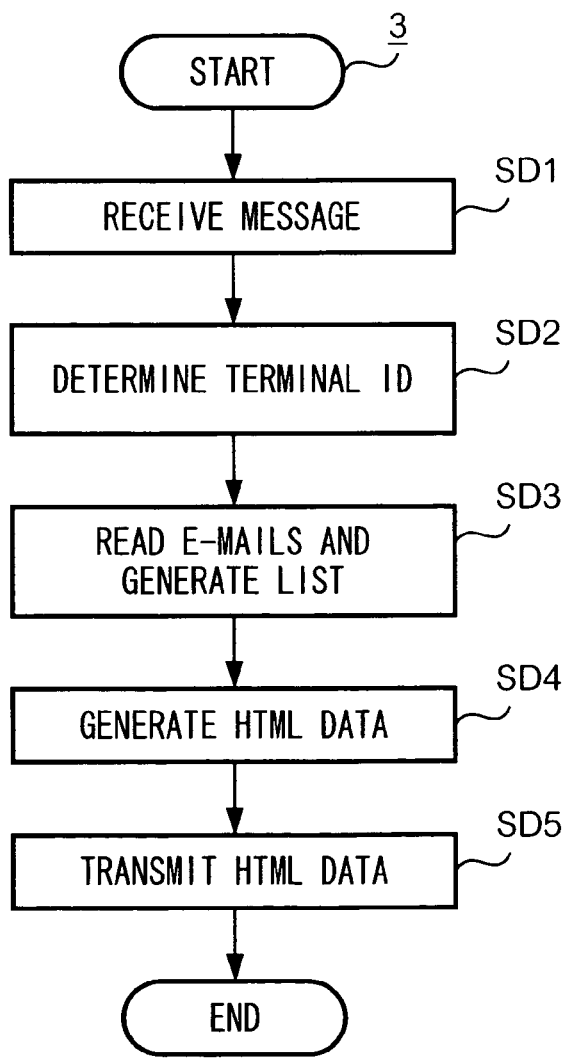
FIG. 8 is a drawing illustrating e-mail accounts management table 332*a* stored in non-volatile storage unit 332 of e-mail management apparatus 3 according to the present invention.
FIG. 9 is a flow chart illustrating a flow of an e-mail bulk data transfer operation of CPU 30 in e-mail management apparatus 3.

After the above-described operations, e-mail accounts management table 332*a* stored in non-volatile storage unit 332 of e-mail management apparatus 3 is updated to the state as shown in FIG. 8. When e-mail accounts management table 332*a* is stored as shown in FIG. 8, forwarding of e-mails addressed to the e-mail address corresponding to the e-mail account 'AAA1' is stopped; and e-mails addressed to the e-mail address corresponding to the e-mail account 'AAA2' are, in turn, forwarded to the communication terminal 1.

Accordingly, a customer carrying communication terminal 1 can change the active e-mail account freely, so as to avoid receiving junk mails. For example, when a lot of junk mail messages are transmitted to an e-mail address corresponding to the e-mail account 'AAA1', the customer carrying communication terminal 1 can change the active e-mail account from the e-mail account 'AAA1 'to ' AAA2', so as to avoid receiving such junk mails. It is to be noted that e-mails addressed to the e-mail address corresponding to the e-mail account 'AAA1' remain stored in the mailbox corresponding to the terminal identifier of communication terminal 1 after the change of the active e-mail account, although the e-mails are not forwarded in the present example.

B-4: E-mail Bulk Transfer Operation

Fourth, an e-mail bulk transfer operation in e-mail management apparatus 3 will be described with reference to FIG. 9. FIG. 9 is a flow chart illustrating a flow of an e-mail bulk transfer operation of CPU 30 in e-mail management apparatus 3.

As shown in FIG. 9, when a customer uses the browsing function of communication terminal 1 to request the bulk transfer of e-mails address to the destination e-mail address corresponding to the e-mail accounts provided to the customer, communication terminal 1 transmits the request to e-mail management apparatus 3. In the present embodiment, the request includes a terminal identifier of communication terminal 1. The request is transmitted to e-mail management apparatus 3 via base station 21 and mobile packet communication network 2.

As shown in FIG. 9, CPU 30 of e-mail management apparatus 3 receives a request via first communication interface unit 31 (step SD1). and extracts a terminal identifier included in the request (step SD2). CPU30 generates bulk data including all elements of all the e-mails stored in the mailboxes corresponding to the terminal identifier extracted in the step SD2 (step SD3); and generates HTML data for displaying the bulk data generated in the step SD3 on the display unit of communication terminal 1 (step SD4). CPU30 transmits a response including the HTML data to the communication terminal 1 (step SD5). The response is transmitted to communication terminal 1 via mobile packet communication network 2 and base station 21.

On receiving the response, communication terminal 1 displays the bulk data, namely all elements of all e-mails, on the display unit via its browser display.

Thus, the customer carrying communication terminal 1 may read e-mails stored in the mailbox corresponding to the terminal identifier of the communication terminal 1 by using the browsing function of the communication terminal 1. Accordingly, even after changing the active e-mail account, the customer can read, if necessary, all elements of the e-mails addressed to the destination e-mail address corresponding to the inactive e-mail account, which was active before the change of the active e-mail account.

C. Modifications

The technical scope of the present invention is not limited to the above-described embodiment. Various modifications may be applicable in the scope of the technical concept of the present invention. Some modifications will be described:

C-1: In the above-described embodiment, e-mail management apparatus 3 has a gateway function of changing communication protocols between mobile packet communication network 2 and the Internet 4. However, another node may have a gateway function of changing communication protocols between mobile packet communication network 2 and the Internet 4, since e-mail management apparatus 3 does not have to have such a gateway function.

C-2: In the above-described embodiment, e-mail management apparatus 3 has both an HTTP server function and an e-mail server function. However, two separate computer apparatuses may have the HTTP server function and the e-mail server function, respectively.

Figures 10, 11:
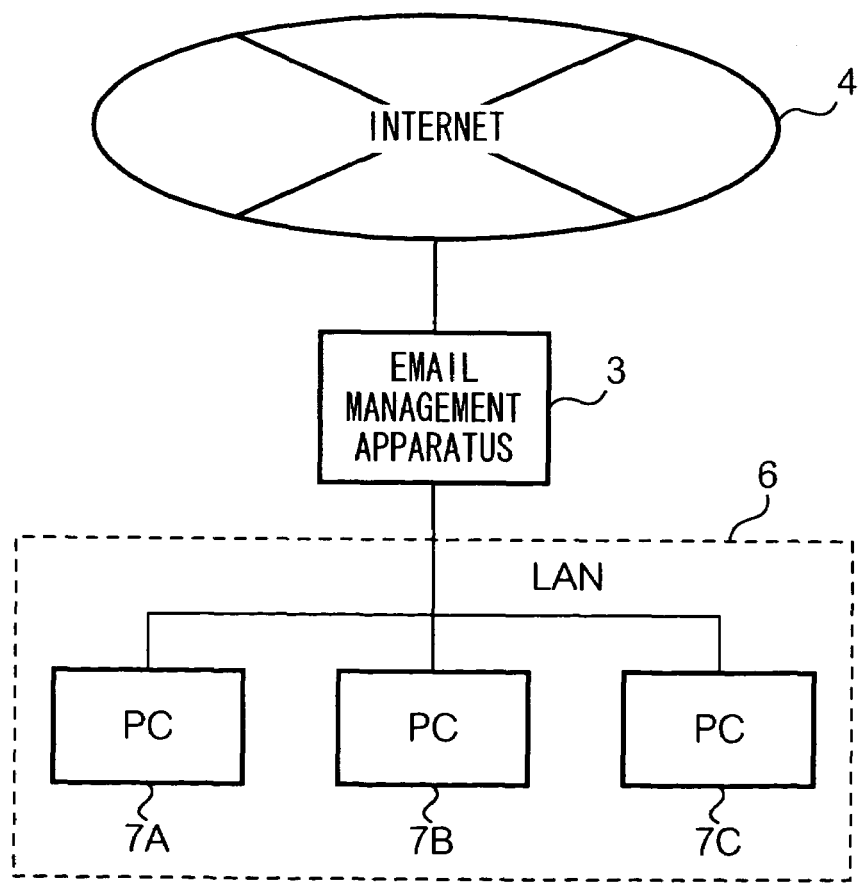
FIG. 10 illustrates an example of bulk data according to modification C-3 of the present invention.
FIG. 11 is a drawing illustrating a configuration of communication system and e-mail management apparatus 3 according to modification C-5 of the present invention.

C-3: In the above-described embodiment, the bulk data including all elements of all the e-mails stored in the mailboxes are transferred to communication terminal 1, so that the customer of the communication terminal 1 can read all elements of the e-mails addressed to the destination e-mail address corresponding to the inactive e-mail account, which was active before the change of the active e-mail account. However, the bulk data, transferred from the e-mail management apparatus 3 to communication terminal 1, does not have to include all elements of all the e-mails. For example, as shown in FIG. 10, the bulk data may include only source e-mail addresses and titles of the e-mails stored in the mailboxes. Communication terminal 1 displays such bulk data, so as to prompt a customer to select desired e-mails. E-mail management apparatus 3 transmits all elements of the selected e-mails to communication terminal 1, in response to the selection by the customer. Thus, since only all elements of the e-mails selected by the customer are transmitted, the number of transmitted packets can be reduced compared to the case of transmitting all elements of all e-mails stored in the mailboxes, such that loads of a packet communication can be reduced between communication terminal and e-mail management apparatus 3.

In another modification, e-mail management apparatus 3 may notify a source e-mail address and a title of an e-mail to communication terminal 1, every time e-mail management apparatus 3 receives the e-mail to be forwarded to the communication terminal 1. A customer is then able to select desired e-mails on the basis of the received source e-mail addresses and/or titles of e-mails. Subsequently, e-mail management apparatus 3 transmits the selected e-mails to communication terminal 1, in response to the selection. Thus, although communication terminal 1 receives source e-mail addresses and titles of junk mail messages, communication terminal 1 does not receive all elements of junk mail messages unless the customer requests them.

C-4: In the description of the above-described embodiment, only one e-mail account is active among a plurality of e-mail accounts provided to a customer carrying communication terminal 1. However, the number of active e-mail accounts may be greater than 1.

In the above-described embodiment, an e-mail account flag is used to designate whether an e-mail account provided to a customer is active; and e-mail accounts management table 332a stores a record of an e-mail account and a corresponding e-mail account flag. However, statuses of e-mail accounts stored in e-mail accounts management table 332a may be designated in other ways. For example, e-mail accounts management table 332a may store a record of e-mail accounts provided to a customer, terminal identifier of communication terminal 1 carried by the customer, and a registration time when the e-mail account is provided to the customer. The e-mail account corresponding to the most recent registration time may be regarded as active.

In another modification, e-mail accounts management table 332a may store a plurality of records of e-mail accounts and a corresponding terminal identifier in the order of the registration times, such that the registration times do not have to be stored.

Namely, statuses of e-mail accounts stored in e-mail accounts management table 332a should be designated in such a way that CPU30 may determine which e-mail account s active.

C-5: In the above-described embodiment, a telephone number stored in communication terminal 1 is used as a terminal identifier. However, other information may be applicable as the terminal identifier of communication terminal 1. For example, a manufacturer's serial number of communication terminal 1 may be used as a terminal identifier of communication terminal 1.

For another example, control information in conformity with various communication protocols such as NWMP (Network Management Protocol) may be transmitted and received between nodes in mobile packet communication network 2. Such control information may be applicable for the terminal identifier of communication terminal 1, since the control information is generated in mobile packet communication network 2 and the customer carrying the communication terminal can rarely falsify the control information. Accordingly, security of e-mail communications is improved, such that an unauthorized or unregistered party cannot read e-mails addressed to another customer.

In the above-described embodiment, a terminal identifier is stored in communication terminal 1. However, a terminal identifier may be stored in a detachable storage, such as SIM (Subscriber Identity Module) or UIM (User Identity Module). Further, an identifier assigned to each SIM or UIM may be used as a terminal identifier.

In the above-described embodiment, a mobile phone is used as communication terminal 1 for communicating with e-mail management apparatus to receive an e-mail communication service. However, a PC (personal computer) 7 connected to e-mail management apparatus 3 via LAN (Local Area Network) 6, for example, may be applicable as communication terminal as shown in FIG. 11. In the present case, the IP address assigned to a PC7 may be used as the terminal identifier.

It is to be noted that e-mail management apparatus 3 according to the present invention performs its functions most effectively when used with a mobile phone. The reasons are as follow: Since customers carrying mobile phones can receive e-mails with few limitations as to place and time for receiving e-mails, junk mail senders tend to send their advertisements to customers carrying mobile phones. Namely, customers receiving e-mails in their mobile phones may receive more junk mails than customers receiving e-mails in their PCs. Thus, the e-mail management apparatus 3 according to the present invention performs its functions most effectively when used with a mobile phone.

C-6: In the above-described embodiment, access to e-mail management apparatus 3 is controlled only by using the terminal identifier stored in communication terminal 1. However, an authentication mechanism using a password may be added to the access control.

In the present case, e-mail management apparatus 3 stores a table including a record having a terminal identifier of communication terminal 1 and a corresponding password. Communication terminal 1 prompts a customer to input his or her password, before transmitting requests to e-mail management apparatus 3. Communication terminal 1, then, transmits requests including the password input by the customer and the terminal identifier of communication terminal 1. E-mail management apparatus 3 authenticates the customer on the basis of the terminal identifier and the password included in the requests.

Thus, an authentication operation is performed using both terminal identifier and password. Accordingly, security of e-mail communications is improved, such that a third party can not read e-mails addressed to the customer of the communication terminal 1 via communication terminal 1, since the third party does not know the password.

C-7: In the above-described embodiment, e-mail management software is preinstalled in e-mail management apparatus 3. However, e-mail management software may be installed from a computer readable magnetic/optical storage medium, or electronic storage medium such as ROM. Also, e-mail management software may be installed in e-mail management apparatus 3 after being downloaded via a network such as the Internet 4.

What is claimed is:

1. An e-mail management apparatus, comprising:
a first storage unit configured to store a record for each of a plurality of e-mail accounts provided to a communication terminal, wherein the communication terminal is configured to be carried by a customer, wherein each record includes an e-mail account flag for a respective e-mail account of the e-mail accounts, wherein each e-mail account flag indicates a status of the respective e-mail account as active or inactive and a terminal identifier of the communication terminal;
a processor in communication with the first storage unit, the processor configured to change the status of any one of the plurality of e-mail accounts in response to a change status request from the communication terminal;
a communication interface in communication with the processor, the communication interface configured to receive e-mails;
a second storage unit in communication with the processor, the second storage unit comprising an electronic mailbox that corresponds to the terminal identifier, the electronic mailbox configured to store received e-mails as a function of the received e-mails being addressed to at least one of the e-mail accounts;
wherein the communication interface is further configured to transmit to the communication terminal, without receipt of a request from the communication terminal for transmission of the received emails, a first e-mail of the received e-mails stored in the electronic mailbox based upon the first e-mail being addressed to a first e-mail account of the email accounts, wherein the status of the first e-mail account is represented as active by the e-mail account flag included in the record that corresponds to the first e-mail account; and
wherein the communication interface is further configured to transmit to the communication terminal, in response to receipt of the request for transmission of the received e-mails, a second e-mail of the received e-mails stored in the electronic mailbox and addressed to a second e-mail account of the e-mail accounts, wherein the status of the second e-mail account is represented as inactive by the e-mail account flag included in the record that corresponds to the second e-mail account.

2. The e-mail management apparatus of claim 1, wherein the processor is further configured to generate a set of text data from an e-mail of the received e-mails stored in the electronic mailbox, wherein the set of text data is evaluated by a browsing function; and
wherein the communication interface is further configured to transmit the set of text data to the communication terminal.

3. The e-mail management apparatus of claim 1, wherein the communication interface is further configured to transmit a list of titles of the received e-mails stored in the electronic mailbox to the communication terminal; and wherein the communication interface is further configured by the processor to forward e-mails selected by the customer from among the list of titles of the received e-mails in response to the transmission of the list of titles from the communication terminal.

4. The e-mail management apparatus of claim 1, wherein the processor is further configured to authenticate a request to forward the received e-mails stored in the electronic mailbox; and
wherein the communication interface is further configured to transmit the received e-mails stored in the electronic mailbox to the communication terminal in response to authentication of the terminal by the processor.

5. The e-mail management apparatus of claim 1, wherein the communication terminal is configured as a mobile phone; and
the first storage unit is further configured to store a telephone number assigned to the mobile phone, wherein the telephone number is used as the terminal identifier.

6. An e-mail forwarding method, comprising:
storing a record for each of a plurality of e-mail accounts provided to a communication terminal configured to be carried by a customer, wherein each record includes an e-mail account flag that corresponds to a status of a respective e-mail account of the plurality of email accounts as active or inactive and a terminal identifier of the communication terminal;
changing the status of at least one of the e-mail accounts in response to a request from the communication terminal;
receiving e-mails;
storing the received e-mails in an electronic mailbox that corresponds to the terminal identifier when the received e-mails are addressed to at least one of the e-mail accounts;
transmitting to the communication terminal, without receipt of a request for transmission of emails from the communication terminal, a first e-mail of the received e-mails stored in the electronic mailbox when the first e-mail is addressed to a first e-mail account of the plurality of email accounts, wherein the first e-mail account has the status of which is represented as active by the e-mail account flag included in the record that corresponds to the first e-mail account; and transmitting to the communication terminal, in response to receipt of the request for transmission of e-mails from the communication terminal, a second e-mail of the received e-mails stored in the electronic mailbox and addressed to a second e-mail account of the plurality of e-mail accounts, wherein the second e-mail account has the status of which is represented as inactive by the e-mail account flag included in the record that corresponds to the second e-mail account.

* * * * *